INVENTOR
ROBERT H. JESPERSEN

ATTORNEYS

United States Patent Office 3,100,095  
Patented Aug. 6, 1963

3,100,095  
TWIN ENGINE THROTTLE SYNCHRONIZER  
Robert H. Jespersen, West Haven, Conn., assignor, by mesne assignments, to the United States of America as represented by the Secretary of the Navy  
Filed Oct. 19, 1961, Ser. No. 146,386  
4 Claims. (Cl. 244—83)

The present invention relates to a system for synchronizing the throttle of engines, and more particularly, to a system for synchronizing twin engines of a helicopter.

The helicopter has been the most successful rotary wing vertical take-off and landing aircraft developed to date. Its capabilities of rising vertically, operated in confined areas by forward, backward, and sideward sliding movements, and by hovering over a fixed point have been unequalled. While having the advantages of slow flight characteristics and zero landing speed, efforts have been made to increase the cruising speed of the helicopter.

Vertical lift above the region of ground effect requires the maximum horse-power available in the helicopter. A lack of available installed horse-power is a serious limitation on both lift and cruising speed of many present day helicopters. Consequently, helicopters employing the use of a plurality of motors, usually two, for operating a plurality of rotors have been developed in an attempt to cure the horse-power deficiency. Such helicopters employing tandem, intermeshing synchronous, and quadruple rotors driven by a plurality of engines require, for normal operation, a synchronous throttle system for maintaining uniform lift, stability, and control. Without a synchronous throttle system for a helicopter driven by a plurality of engines the lack of control, of lift, and of stability and the excess of vibration would reach unacceptable limits completely eliminating or destroying the advantages of the helicopter.

As a result of the normal inter-relationships of helicopter flight controls, a great deal of skill and dexterity is required on the part of the helicopter pilot. For this reason, flight training requires approximately twice as much time as that of fixed-wing pilots. Consequently, helicopter controls should, where possible, be instrumented for more simple operation to reduce the tension and fatigue of the helicopter pilot.

The instant invention takes into consideration the fact that helicopter pilots are under a higher degree of tension and fatigue than the pilot of a fixed-wing aircraft. Through the use of a cam action device the independent throttle control from the pitch stick and from a programmed flight servo control operate a mixing unit which synchronously operates a throttle on to each of a plurality of engines. A manual quadrant control for operation of the throttle system is directly connected to the mixing unit which also responds thereto for synchronous throttle arm operation. The instant invention in providing a plural engine synchronous throttle system achieves, while maintaining the vibration at a minimum, a system capable of simple operation and offering greater lift, uniform lift, and the maintenance of stability and close control of the advantageous operational capabilities of helicopters. Additional safety is also achieved through the use of the instant invention in plural engine helicopters since it insures a more uniform inertial rotation of the rotors for autogyro-type flight in the event of engine failure.

An object of the present invention is to achieve, in response to plural controls, synchronous throttling of a plurality of engines.

Another object is to provide a synchronous throttle system responsive to a plurality of independent throttle controls to achieve uniform operation of a plurality of engines.

A further object of the invention is the provision of a synchronous throttle control system responsive to a plurality of controls which avoids complication for the operator and which is capable of a simple operation.

Other objects and many of the attendant advantages of this invention will be readily appreciated as the same becomes better understood by reference to the following detailed description when considered in connection with the accompanying drawings wherein.

Figure 1:
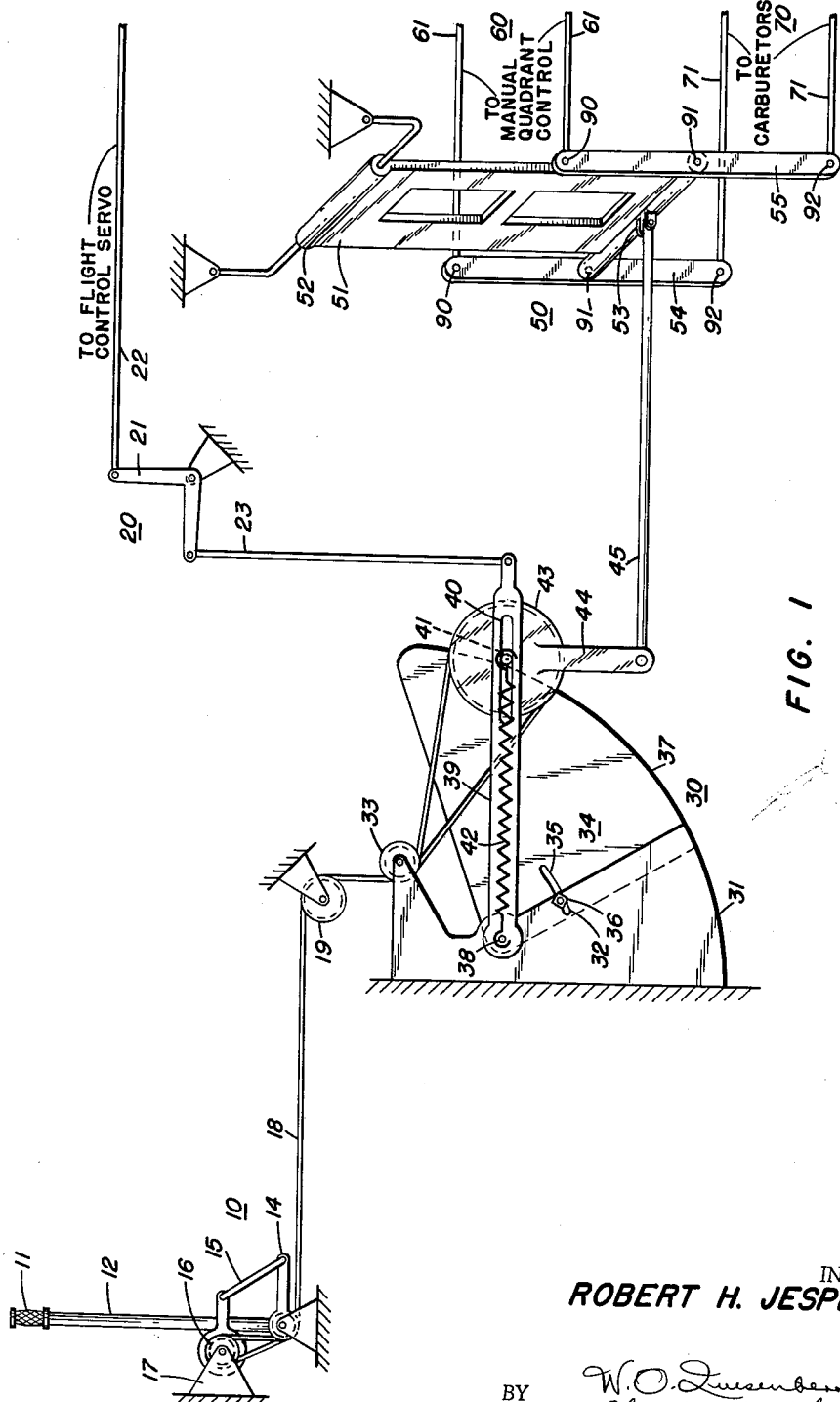
FIG. 1 illustrates a diagrammatic view of a synchronous throttle system according to the invention.

Referring now to the drawings, wherein like reference characters designate like or corresponding parts throughout the several views, there is shown in FIG. 1 a throttle synchronizer system comprised of a pitch stick control 10, a servo control 20, and a manual quadrant control 60. The pitch stick control 10 and the servo control 20 reciprocate a mixing unit 50 through a cam action device 30 to regulate the throttle control 70. The manual quadrant control 60 is connected directly to the mixing unit 50 to thereby regulate the throttle control 70.

Pitch stick control 10 is connected to the cam action device 30 by an endless cable 18 over a pulley 19. Reciprocating movement of the endless cable 18 may be achieved either by pivoting the total pitch stick 12 or by twisting grip 11. That is, the pitch stick control may be instrumented, in any particular situation, to reciprocate the endless cable 18 either by a motorcycle type twist grip 11 or by pivotal movement of the entire pitch stick 12. The pitch stick control 10 may also be instrumented in FIG. 1 so as to be physically capable of control by both twisting the grip 11 and by pivoting the entire pitch stick 12.

Figure 2:
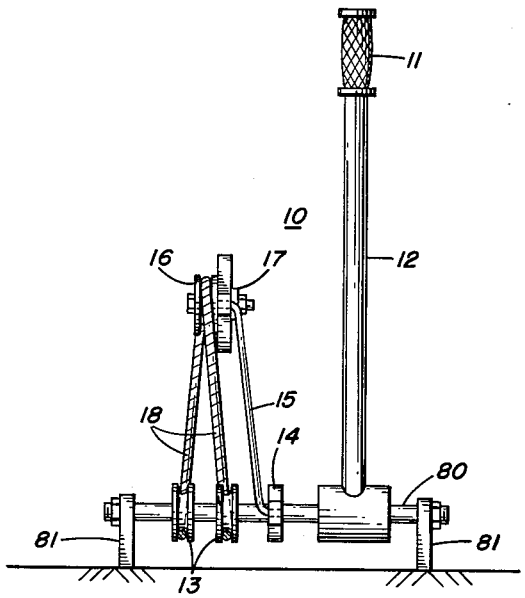
FIG. 2 illustrates a front elevation of a pitch stick in an associated cable and pulley system in accordance with the invention.
Figure 3:
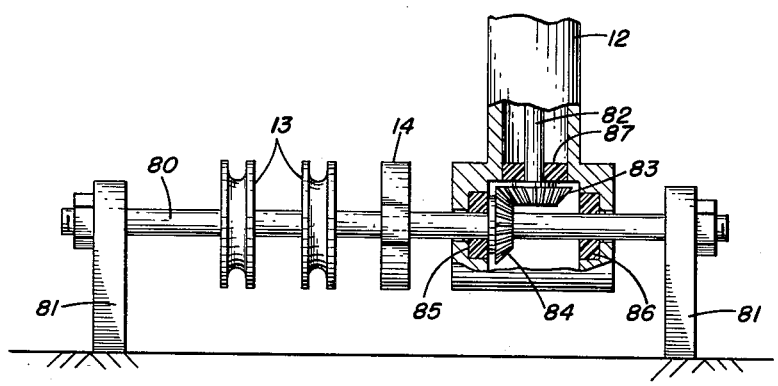
FIG. 3 is an exploded front elevation, partly in section, of an operable relationship of movable pitch stick elements.

Referring now to the operation of pitch stick 10 as can be best seen with reference to FIGS. 1, 2, and 3, it may be seen that twist grip 11 is connected internally of the pitch stick 12 by rod 82 to a beveled gear 83. If the pitch stick 12 is held stationary and the grip 11 rotated the beveled gear 83 rotating with rod 82 will rotate the beveled gear 84 attached to rod 80 upon which are rotatably maintained idler pulleys 13 and fixedly maintained crank 14. Shaft 80 is allowed to rotate about its axis and is held fixed from moving along its axial axis by brackets 81. Rotation of rods 80 and 82 may be guided through bearings 85, 86, and 87 which may be of a suitable material such as Teflon. As shaft 80 rotates about its longitudinal axis the crank 14 affixed thereon causes, through linkage 15, rotational movement of integral drive pulley-crank combination 16 to drive the endless cable 18 through the idler pulleys 13 rotatably mounted on shaft 80. Drive pulley crank combination 16 is mounted on a fixed member 17 so as to be rotatable with respect to said fixed member 17.

Reciprocation of the endless cable 18 may also be caused by physically holding the twist grip 11 from rotation while the pitch stick 12 is rotated about shaft 80 thereby causing beveled gears 83 and 84 to assume a non-rotatable relationship equivalent to a rigid link for rotation of the shaft 80. Thereafter rotation of shaft 80 causes the endless cable 18 to reciprocate as in the case in which grip 11 is twisted. It will be noted that the difference between the action of the pitch stick when the endless cable 18 is reciprocated by the twisting of twist grip 11 is that rod 82 rotating the beveled gear 83 causes a rotational meshing relationship with beveled gear 84 whereas pivotal action of the pitch stick 12 while holding grip 11 stationary causes the beveled gears 83 and 84 to maintain a stationary relationship equivalent to a rigid link.

The servo control unit operates the cam action device 30 by connecting a servo system to a right angle pivotal link 21 fixedly positioned at its vertex. As the right angle pivotal link 21 is rotated about its vertex by reciprocation of link 22 rod 23 which is connected to the cam action device 30 reciprocates.

Results of the reciprocating movement of the endless cable 18 and rod 23 causes rotation of the driven pulley 43 and arm 44 thereby in turn reciprocating rod 45. This is accomplished through the cam action device 30 which has a fixed member 31 upon which is maintained a pulley 33 and adjustable cam member 34 and rotatable arm 39. Fixed member 31 has a slot 32 and adjustable cam member 34 has a slot 35 which coacts with slot 32 to adjust the relative positions of members 31 and 34 by 36 which is a common bolt means for fixedly holding a set relationship of members 31 and 34. Adjustable cam member 34 has a cam surface 37 for allowing movement of a cam follower 41 along the surface 37. While the adjustable cam member 34 is maintained on one side of member 31 rotatable arm 39 is maintained in rotatable relationship about point 38 on a side opposite of member 31 from the side upon which member 34 is maintained. In this manner a driven pulley 43 may be maintained between the adjustable cam member 34 and the rotatable arm 39 and parallel with the plane of member 31. The driven pulley 43 has an integral cam follower, as indicated by the broken lead line 41 which extends through the driven pulley 43 and into contact with the cam face 37 of the adjustable cam member 34 as well as into the lost motion slot 40 of rotatable arm 39. A tension spring 42 is maintained in contact with an extension of the integral cam follower 41 at one end thereof and at the other end is connected at point 38 which is the center of rotation of rotatable arm 39.

Figure 4:
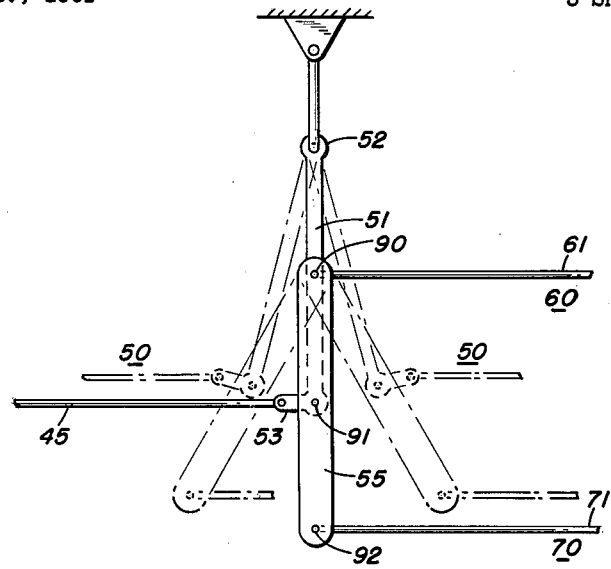
FIG. 4 illustrates, in accordance with the invention, the operation of the cam action device in response to pitch stick and servo controls.

In operation reciprocation of the endless cable 18 which is wrapped around the driven pulley 43 will cause the cam follower to rotate and move either up or down the cam surface 37 while under the tension of tension spring 42 thereby also causing reciprocal movement of the integral arm 44 of driven pulley 43. Operation of the cam action device 30 in response to reciprocation of rod 23 is achieved in the same manner since the integral cam follower 41 rolls along the cam surface 37 of the adjustable cam member 34 as the rotatable arm 39 is raised or lowered by reciprocation of rod 23. The rotation of the cam follower 41 causes rotation of the integral driven pulley 43 and integral rotatable arm 44 thereby causing reciprocation of rod 45. The reciprocating rod 45 reciprocates the mixing unit 50 so as to regulate movement of the carburetor throttle arms 71. As can be best seen in FIG. 4, rod 45 is connected to the midpoint of the rotatable hinge member 51 of the mixing unit 50 by a connection means 53. Member 51 is fixedly connected to a rod 52 but is allowed to rotate about the longitudinal axis of the rod when reciprocated through an arc by rod 45. In addition to the connecting means 53 and the rod 45 connected thereto being connected to the free end of the rotatable hinge member 51 pivotal members 54 and 55 are connected at their midpoint 91 to the free end of the rotatable hinge member. To the mixing unit 50 is connected a manual quadrant control 60 through manual quadrant control arms 61 connected to pivotal members 54 and 55 at their extremities 90. Since there will be more resistance to movement in the arms of the manual quadrant control 61 than in the carburetor throttle arms 71 the manual quadrant control 60 will hold at extremities 90 the pivotal elements 54 and 55 thereby causing pivoting of pivotal elements 54 and 55 about connections 90 in response to reciprocation of rod 45.

In this manner carburetor throttle arms 71 connected to pivotal members 54 and 55 at points 92 will be regulated in accordance with the pitch stick control 10 and the flight control servo 20.

Figure 5:
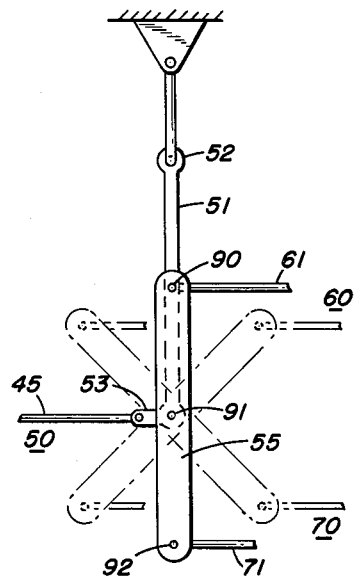
FIG. 5 illustrates, in accordance with the invention, the operation of the mixing unit in response to pitch stick and servo controls.

Referring now to the manual quadrant control 60 and its operation it can be seen in FIG. 5 that reciprocal operation of the quadrant control arms 61 will cause the pivotal members 54 and 55 to pivot about their midpoints 91 where they are connected to the free end of the rotatable hinge member 51 of mixing unit 50. With resistance to movement being greater in the rod 45 than in the carburetor throttle arms 71 rod 45 will hold body member 51 so that the pivoting members 54 and 55, pivoting about point 91, will cause points 92 and the carburetor throttle arms 71 connected to points 92 on pivotal members 54 and 55 to reciprocate thereby regulating the throttle of the engines.

It should be understood, however, that synchronous regulation of the throttle to a plurality of engines through carburetor throttle arms 71 need not be accomplished by but one control at a given time. In fact, the regulation of the carburetor throttle arms 71 may be singularly or cumulatively caused by the pitch stick control 10, the servo control 20, or the manual quadrant control 60 or by any combination thereof. The cam action device 30 may also be instrumented so as to allow the reciprocation of endless cable 18 to rotate the driven pulley 43 and integral arm 44 without effecting in any way the movements of rod 23 of the servo control 20.

It is, of course, possible to also instrument the cam action device 30 so that reciprocation of rod 23 will cause rotation of the driven pulley 43 and integral arm 44 without causing any cable movement in the endless cable 18. In order to operate cable 18 by the pitch stick control without also effecting operation of the servo control, a rotatable bushing over the core of the integral cam follower would be required so as to allow rotation of the driven pulley 43 and integral arm 44 without causing any movement of rotatable arm 39 thereby avoiding movement of rod 23 of the flight servo control 20. Actuation of the servo control through rod 23 without effecting reciprocal movement in the endless cable 18 may be accomplished by again employing a rotatable bushing on the core of the integral cam follower and adjusting the adjustable cam member 34 so that the cam surface 37 will have a curvature which is equal to a portion of the convolution of the cable 18 as it is wrapped about pulley 33. With this construction and mode of operation, vertical movement of rod 23 and consequent raising and lowering of the attached end portion of arm 39 will not be attended by reciprocation of cable 18, but instead the cable will merely wrap and unwrap itself relative to pulley 33, or, as it may be said, pulley 33 will roll within the cable. Thus, tension spring 42 will cause the driven pulley to reciprocate up and down with the rod 23 and the friction between the endless cable 18 and driven pulley 43 will cause the integral arm 44 to reciprocate rod 45 if the friction between the endless cable 18 and the driven pulley 43 is greater than the resistance to movement of the carburetor throttle arm linkage 71.

Obviously, many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. A throttle synchronizer for simultaneously controlling at least two engines having carburetor throttle arms comprising: Mixing means for connection to said carburetor throttle arms of said engines, said mixing means having a plurality of pivotal members each connected at a first extremity to a different one of said carburetor throttle arms, a member having two ends hinged at one end for rotation thereabout, said pivotal members being pivotally attached at the midpoints thereof to said second end of said hinge member; first control means pivotally connected to said pivotal members at a second extremity opposite said first pivotal member extremity to control said mixing means by pivoting said pivotal members about their midpoints thereby regulating said carburetor throttle arms connected to said first extremity of said pivotal members; second control means connected to said second end of said hinge member for moving the same about its first end thereby pivoting said pivotal members and synchronously throttling said engines.

2. A throttle synchronizer as claimed in claim 1 further characterized by a cam action device for controlling said second control means, said device comprising a fixed member, a cam member mounted on said fixed member having a cam surface, an arm pivotally mounted adjacent one end thereof on said fixed member having an axial slot adjacent its other end, a cam follower mounted in said slot for axial movement therein, spring means for holding said cam follower in cooperating relation with said cam surface; a pulley mounted for rotational movement relative to said cam follower, a radial bar extending from said pulley connected in cooperating relation with said second end of said hinge member, and third control means for rotating said pulley whereby rotational movement of said second arm of said radial bar produces synchronous movement of said pivotal members of said mixing means thereby synchronously throttling said engines.

3. A throttle synchronizer as claimed in claim 2 wherein said first, second, and third control means are, respectively, a manual quadrant control, a flight servo control, and a pitch stick control, which pitch stick control comprises a pivotal mounting for said stick permitting reciprocating movement thereof, a rotatable handle grip for said stick, and a cable operatively connected to said pulley and means for moving said cable responsive to rotation of said grip and reciprocating movement of said stick.

4. A throttle synchronizer as claimed in claim 2 wherein said fixed member and said adjustable cam member each contain a slot for coacting to adjust the position of the cam surface of said adjustable cam member with respect to said fixed member.

References Cited in the file of this patent
UNITED STATES PATENTS

| | | |
|---|---|---|
| 1,651,821 | Heath | Dec. 6, 1927 |
| 2,820,340 | Dolza et al. | Jan. 21, 1958 |
| 3,022,638 | Prentiss | Feb. 27, 1962 |